Oct. 21, 1941. T. A. BOWERS 2,259,548
OIL RING STRUCTURE
Filed Sept. 23, 1939
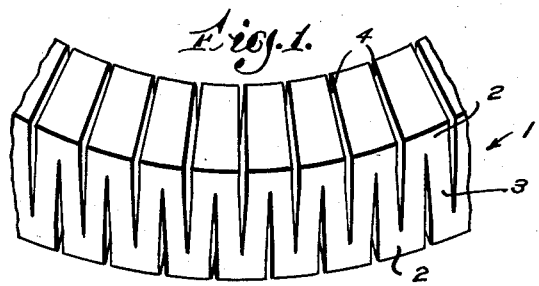
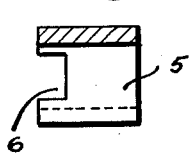
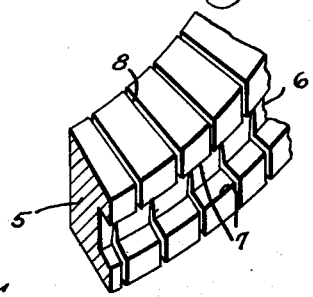
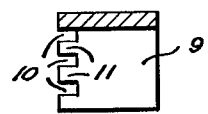
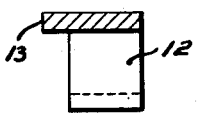
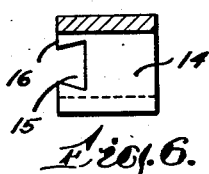
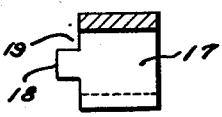
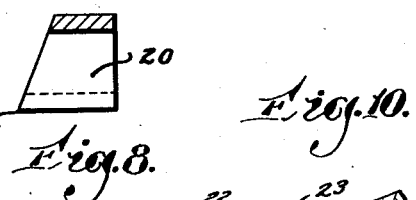
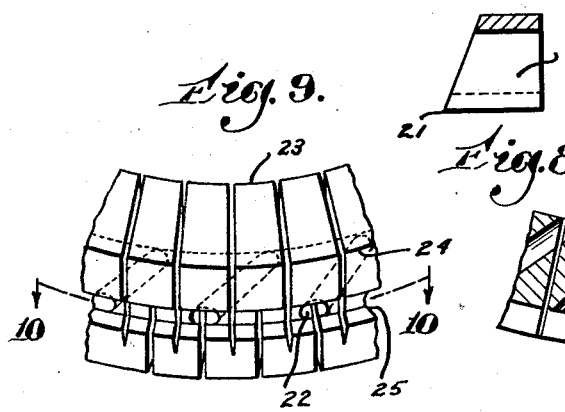
Inventor
Thomas A. Bowers
by
Attorney Patented Oct. 21, 1941

2,259,548

UNITED STATES PATENT OFFICE 2,259,548

OIL RING STRUCTURE

Thomas A. Bowers, Boston, Mass., assignor to Power Research Corporation, Boston, Mass., a corporation of Massachusetts Application September 23, 1939, Serial No. 296,285

3 Claims. (Cl. 309—45)

This invention relates to piston rings and more especially to piston rings of the oil control or oil metering type fabricated from a strip of piston ring material.

In rings of the fabricated type referred to, a strip of piston ring material is reversely folded upon itself to comprise a ring body presenting a great number of interstices. An attempt has been made to scrape oil with a fabricated ring and to utilize the interstices of such a structure for effecting efficient passage therethrough of oil scraped from the cylinder wall. However, in the usual construction of a fabricated ring, the interstices may occur of a size such that a substantially gas-tight ring results and this prevents a suitable passage of oil when the structure is employed as an oil ring. Also, it is impossible to form conventional radial oil holes in the ring as this may sever the fabricated structure.

The chief object of the present invention is to improve fabricated ring structures with particular reference to their functioning as oil control members and to provide novel oil passageways, of such character that they avoid any objectionable weakening or severing of the ring structure. It is also an object of the invention to devise a fabricated ring presenting oil scraping edges and to effect improvements in the flexing character of the ring. The invention further aims to provide a simple, cheap, and efficient oil control piston ring.

The nature of the invention and its objects will be readily undertsood from the following description when read in connection with the accompanying drawing and the novel features will be more particularly pointed out in the appended claims.

In the drawing:

Figure 1 is a fragmentary perspective view of a fabricated piston ring illustrating one embodiment of the invention.

Fig. 2 is a detail view illustrating a modified form of my invention.

Fig. 3 is a fragmentary perspective view further illustrating a piston ring material similar to that indicated in Fig. 2.

Figs. 4, 5, 6, 7 and 8 are detail cross sectional views illustrating further modifications of piston rings.

Fig. 9 is a fragmentary perspective view of a ring still further embodying a modification of the invention; and Fig. 10 is a plan cross section taken on the line 10—10 of Fig. 9.

Referring in detail to the drawing, Fig. 1 illustrates one embodiment of my invention. Figs. 2-8 inclusive illustrate modifications relating to a further aspect of the invention; and Figs. 9 and 10 illustrate another modification relative to a still further aspect of the invention.

In the construction shown in Fig. 1, arrow 1 indicates a piston ring fabricated from a strip of piston ring material. The strip of material may comprise any suitable material, as for example steel, alloy, or the like, which is capable of functioning as a piston packing. In accordance with the usual method of fabricating piston rings from such material, the strip has been reversely folded upon itself to provide crown-forming portions 2 and web-forming portions 3 connecting the crown-forming portions. The crown-forming portions may consist of the points of folding of a strip or the crowns may be comprised by a section of the strip occurring between the points of folding, or the strip may be formed so as to provide substantially square crowns such as that shown in Fig. 1.

The sheet metal employed in the strip 1 is of a strongly resilient character such that the reversely folded structure is adapted to be compressed upon itself and thereafter exert a uniform radial pressure. According to the usual practice, this radial pressure is made use of to engage the ring with the wall of a cylinder and particularly with cylinder walls which are non-uniformly worn, the ring tending to adhere to the cylinder wall throughout its circumference in all positions of the piston in the cylinder.

Fabricated rings usually occur in a compacted state so that the interstices occurring between the folds are small and tend to retain oil in a film state. The result is a substantially gas-tight ring, which tends to resist free passage of oil therethrough.

In accordance with the present invention, a fabricated ring is formed in the usual manner to comprise a substantially solid body. The ring is then extended from a compacted state by stretching or expanding it until the interstices 4 become opened up, as illustrated in Fig. 1, so that the ring is no longer substantially gas-tight and presents little if any resistance to passage therethrough of oil scraped from the cylinder wall. Very satisfactory passageways are thus available for rapidly carrying away oil and returning it to the crankcase.

The ring tends to absorb oil from the cylinder wall in much the same way as is effected by a sponge. This is due to the fact that almost all cylinders are slightly worn in a tapered manner with the greatest amount of wear occurring at the top. It will be seen that a ring when at the bottom of such a cylinder is compressed most and as the ring moves up the cylinder into increasingly larger diameters, it enlarges somewhat, opening up and tending to suck oil from the cylinder wall. As the ring passes downwardly of the cylinder into smaller diameters, it is again compressed, extruding oil in two directions, out on to the cylinder wall and inwardly to the back of the ring groove. The ring groove is commonly provided with oil passageways which allow some of this extruded oil to pass back into the crankcase.

The step of stretching a compacted ring to increase oil passageways can only be effected with respect to a ring in which the crown-forming portions 2 extend radially between the inner and outer peripheries and constitute the top and bottom of the piston ring. It is pointed out that in another form of reversely folded strip ring the crowns 2 may extend axially of the ring and may comprise the inner and outer peripheries thereof. In this latter type of ring, oil cannot pass radially through the ring and stretching such a structure would not increase oil passageways, nor would the oil absorbing described be effective.

In Figs. 2 and 3, I have shown a ring 5 formed from a strip of piston ring material folded upon itself in the manner already described. In the outer periphery of this ring, I have provided a groove or slot 6, which results in the outer periphery of the ring 5 presenting interrupted circumferential scraping edges 7 adapted to collect oil from the wall of a cylinder and pass it from the groove 6 back through the interstices 8 when these interstices have been opened up to a point such as that described in connection with Fig. 1.

Various other types of grooves or slots may be effected in a fabricated ring structure as for example in Fig. 4, the ring 9 has its outer periphery formed with a plurality of slots or grooves 10, resulting in a plurality of oil scraping edges 11. In Fig. 5 a ring 12 is illustrated, whose outer periphery has been recessed to present a single top oil scraping edge 13. In Fig. 6, a ring 14 has been provided, having its outer periphery recessed with a wedge-shaped opening 15, leaving oil scraping edges 16. In Fig. 7 a ring 17 has been provided, having its outer periphery formed with one relieved oil scraping edge 17 and top and bottom oil reservoirs 19; and in Fig. 8, a ring 20 has been shown having its periphery cut in an angular or beveled manner to provide a single oil scraping edge 21. It will be seen that any of the recessed structures shown in Figs. 2–8 inclusive, may be extended as described in connection with the ring of Fig. 1, or these modifications may be effected in a substantially fluid-tight ring with other means of passing oil through the ring being provided.

In addition to providing oil passages by stretching the ring to increase the width of its interstices, the invention provides for further novel oil passages. It is pointed out that radial holes or openings of conventional type may be readily provided in a resiliently folded strip ring when the crown portions 2 thereof extend axially and comprise the inner and outer peripheries of the ring. However, such holes or openings are not as readily provided when the crown portions extend radially and comprise the top and bottom of the ring. The reason for this is that a radial oil passage or opening to be of any practical value for conducting oil would necessarily be a great deal larger than the thickness of the sheet metal. Consequently, the hole would sever the sheet metal at one or more points and the ring would fall apart.

In accordance with the invention, this difficulty is overcome by locating openings between the inner and outer peripheries of the ring in a non-radial manner such that only a portion of the webs 3 are intersected, as illustrated in Figs. 9 and 10. In these figures it will be observed that openings 22 have been provided, extending in a diagonal manner from the inner periphery 23 of the ring to the outer periphery 24, and by this angular disposition of the groove or opening 22, only portions of any one web 3 are cut away, leaving adequate web portions for keeping the ring structure intact. The provision of diagonally disposed openings through a fabricated ring body, although shown in Figs. 9 and 10 in connection with a groove 25 turned in the outer periphery of the ring, is not limited thereto and may be desired to be effected with a conventional fabricated piston ring of a substantially fluid-tight or other character, or may be desired to be employed with a stretched ring.

The non-radial openings may be provided without weakening the ring and removing portions of the webs 3 allows the webs to bend and flex more readily than the crowns 2, which is desirable.

It will be seen that new and improved oil scraping means have been effected from a reversely folded ribbon ring in a slightly extended position. Also, novel oil passages have been designed which may be employed with fabricated structures without materially weakening such structures, and there is effected an efficient, simple and cheap oil metering ring construction.

While I have shown preferred embodiments of my invention, it should be further understood that various changes and modifications may be resorted to in keeping with the spirit of the invention.

I claim:

1. A piston ring comprising a strip of piston ring material reversely folded upon itself to present crowns and vertically occurring connecting web portions in said ring, said crowns and webs compacted to comprise a substantially solid ring body, said ring body having openings extending between the inner and outer peripheries thereof in a diagonal manner.

2. A piston ring comprising a length of piston ring material reversely folded to comprise crowns and connecting web portions, said ring having oil passages extending between the inner and outer peripheries thereof, said oil passages occurring such that they intersect portions only of any given web portion.

3. A radially flexible piston ring comprising an annular body made up of a plurality of layers of resilient sheet metal, connecting portions for the layers, the connecting portions extending radially of the ring, said annular body having oil passages extending between two of its sides, said oil passages intersecting portions only of any one of the said layers of resilient sheet material.

THOMAS A. BOWERS.